Jan. 16, 1945.   H. G. ATWOOD   2,367,557
PROCESS TO CLARIFY OR CHILL-PROOF WHISKY
Filed Dec. 5, 1940
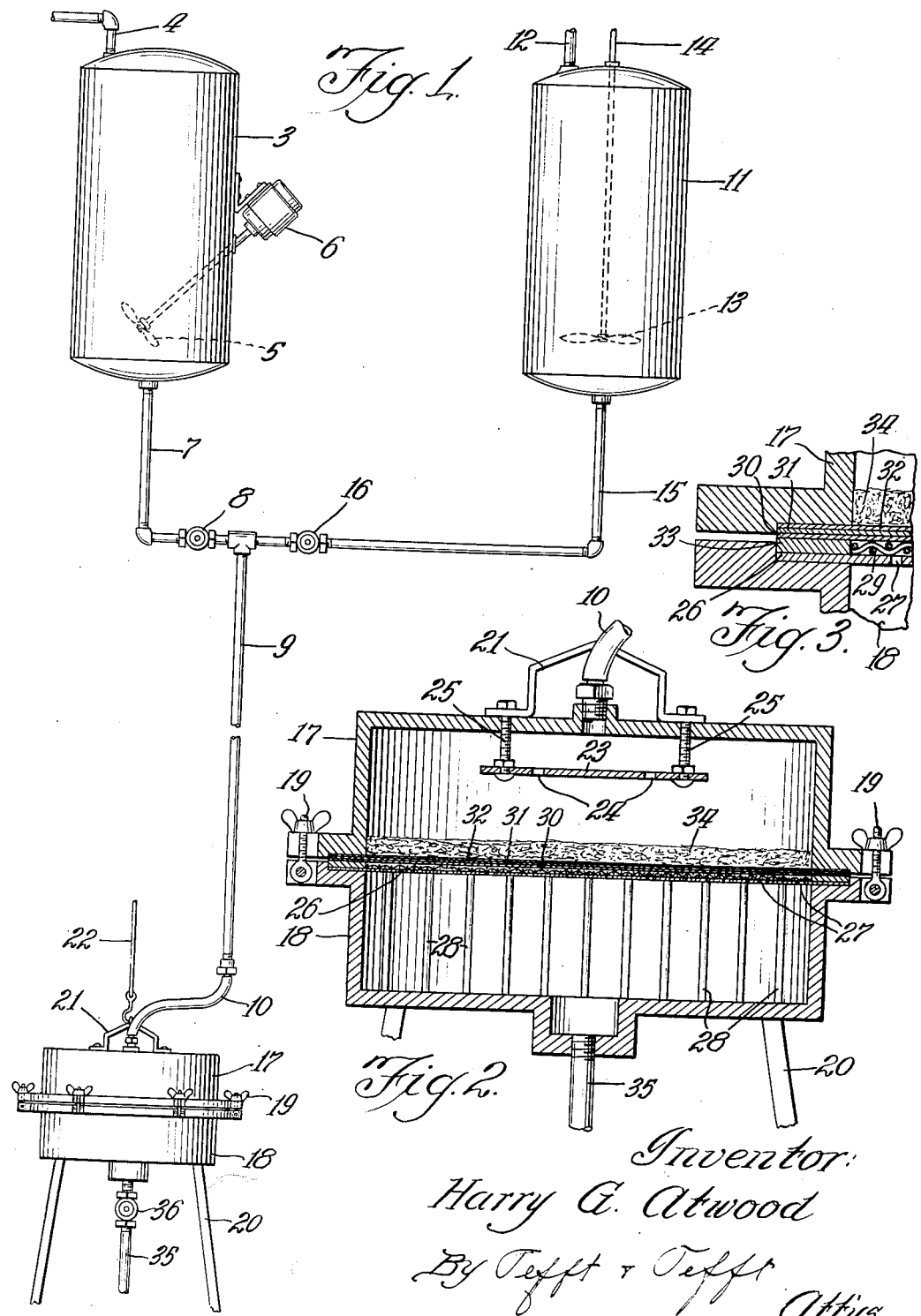
Inventor:
Harry G. Atwood
By Tefft & Tefft
Attys.

Patented Jan. 16, 1945

2,367,557

UNITED STATES PATENT OFFICE 2,367,557

PROCESS TO CLARIFY OR CHILLPROOF WHISKY

Harry G. Atwood, Peoria, Ill.

Application December 5, 1940, Serial No. 368,562

4 Claims. (Cl. 99—48)

This invention relates to the art of permanently clarifying liquid containing material in suspension or not in a true homogeneous solution. It has particular application to beverages and will be disclosed as applied to the clarifying of whiskies.

Distillers have always had trouble with whiskies becoming cloudy or opaque with mother-like gelatinous membranes or which threw out a flocculent precipitate which marred the original brilliant appearance of the beverage. This condition occurred during storage or shipping and was aggravated by low temperatures (40° F. or under), particularly when placed in the consumer's refrigerator.

To prevent this condition distillers have resorted to expensive chilling to precipitate this flocculent material and then filtering it out of the liquid. The results of this process vary in proportion to the temperatures and the filtering methods employed. Generally, unless very low temperatures and low pressure filtering methods are used, only partial or indifferent results are obtained.

The particular object of this invention is to provide an easy, inexpensive method to permanently clarify liquids such as whiskies so as to retain their stable, brilliant appearance under all conditions including low temperatures.

Other objects and benefits will be disclosed in the following descriptions illustrated by the drawing in which Fig. 1 is a diagrammatic elevation view of my combination adsorption and filtering apparatus;

Fig. 2 is an enlarged cross sectional elevation view of the filter; and

Fig. 3 is a further enlarged broken cross sectional view of the joint of the filter.

Now referring to the drawing, and at the outset to Fig. 1, the numeral 3 designates an elevated supply tank fed by an inlet pipe 4 and having an impeller agitator 5 driven by an electric motor 6. An outlet pipe 7 controlled by the valve 8 leads to the pipeline 9 which has a flexible hose connection 10 with the filter. In conjunction with the supply tank 3 is another supply tank 11 having an inlet supply pipe 12 and an agitator 13 driven by the vertical shaft 14. From the bottom of this tank 11 is an outlet pipe 15 controlled by the valve 16 leading to the main pipe 9 connected with the filter by the same flexible tube 10.

The filter has a top section 17 and a lower section 18 which are held together by the wing bolts 19. The filter is supported in a conventional manner by legs 20 and has an outlet pipe 32. The top of the filter is removable by a conventional hoist mechanism 22 attachable to a hoist bracket 21 as shown.

Now referring to Fig. 2, the flexible hose 10 attached to the top of the filter directs the flow of the liquid on to a spreader plate 23 having a series of holes 24 and supported from the top of the filter by studs 25 as shown. It will be appreciated that by this structure liquid entering the filter will be spread more or less evenly over the cross section of the filter proper.

At the joint of the top and bottom sections as clearly shown in Figs. 2 and 3 is interposed a perforated plate 26 having perforations 27 and supported on support studs 28 from the bottom of the section 18 to thus hold the perforated plate 26 in a substantial, level position. On top of the perforated plate 26 is a coarse screen 29 and further on top of the screen is placed three layers of filter paper 30, 31 and 32, and interposed between the filter paper and the plate around the edge of the screen 29 is a gasket 33. It will be appreciated that by this structure, when the wing nuts 19 have drawn the sections 17 and 18 together, a tight joint is formed on the various elements of the filter as described.

A filter bed of diatomaceous earth 34 as will later be described is deposited on the filter papers. A pipeline 35 controlled by the valve 36 leads from the bottom of the filter base 18 and will return the liquid either to the tank 3 or to bottling machines as will later be described in more detail.

I have found that to produce beverage which will retain its brilliant clear appearance under all conditions, a process of ultra filtration and adsorption is necessary. The presence of viable organisms, protein material and other substances present in the liquid indicates that the liquid is not a true solution but a colloidal solution, unstable at low temperature.

Conventional pressure filters will not remove these materials under ordinary temperatures regardless of the fineness of the filtering medium. Experiments have proven that even when the liquid is filtered at tremendous pressure through tight stone the materials pass through the stone and remain the same—unstable solutions.

In pursuing my invention I first mix the whisky with activated carbon in the proportions of 2.68 gms. per gallon of whisky and then pump this mixture to the gravity tank 3 through the pipeline 4. The carbon is kept in suspension by agitation by means of the impeller 5 driven by the motor 6. The pressure tank 3 is supported at about 18 ft. above the filter which gives a pressure of about 5.75 lbs. per inch on the filter bed which I have found to be the optimum pressure for whiskies. My experiments have further proven that pressure greater than 6 lbs. per sq. inch tend to drive the carbon and the colloidal materials through the filter bed which will later be described. I have also found when filtering extreme caution must be used to avoid any pulsation action during the filtering, as any pulsation tends to disturb the filter bed and thus permits colloidal materials to pass through.

In preparing the filter bed I mix a slurry made of 10 gms. of diatomaceous earth per gallon of whisky to be filtered in the slurry tank 11. This slurry is thoroughly mixed by the impeller 13 driven by the shaft 14, the materials being introduced to the tank 11 through the pipeline 12. This slurry is permitted to run through the pipe 15, the valves 16, the pipeline 9 and the flexible tube 10 on to the distributing plate 23 where it is deposited evenly over the entire cross sectional area by my arrangement of perforations 24 and the separation of the disposal plate 23. I find that about .032 gallons of slurry per sq. inch of filter area gives the optimum results and I have found the best selection of filter papers as follows: Element 30 should be the finest commercial grade of filter paper, on top of this a medium fine grade of filter paper should be applied and topmost 32 the relatively coarse commercial grade.

The slurry is allowed to flow by gravity on to the filter and the diatomaceous earth is allowed to settle on the filter paper. The transporting liquid which is the same whisky to be filtered is permitted to run through filter paper and return to the untreated beverage tank 3. The whisky in tank 3 is now thoroughly mixed, all pumping operations stopped and the whisky allowed to quietly flow by gravity on to the filter bed at a pressure of 5.75 lbs. per inch. The first liquor coming through is returned until the flow is perfectly brilliant. The whisky may then be diverted and allowed to flow through the pipe 35 directly to the bottling plant.

I have discovered that by this method a stable brilliant beverage is provided and one which is not affected by low temperatures even to zero degs. F. or below. I have further discovered that a distinct improvement is effected in the odor, taste and smoothness of the filtered product.

Having thus described my invention, I claim:

1. The process of chill-proofing whisky having insoluble material therein, which consists in mixing fine activated carbon with the whisky to provide for the adsorption of the insoluble material by the activated carbon, mixing a diatomaceous earth with the whisky-carbon mixture to form a slurry, depositing the slurry on a filter to form a filter bed, and then filtering the whisky from the slurrry.

2. The process of chill-proofing whisky having insoluble material therein, which consists in mixing fine activated carbon with the whisky to provide for the adsorption of the insoluble material by the activated carbon, mxing a diatomaceous earth with the whisky-carbon mixture to form a slurry, depositing the slurry on a filter to form a filter bed, and then filtering the whisky from the slurry in a state of quiescence with a gravity pressure of less than six pounds per square inch of the filter bed.

3. The process of chill-proofing whisky having insoluble material therein, which consists in mixing fine activated carbon with the whisky in the proportion of approximately 2.5 grams per gallon of whisky to provide for the adsorption of the insoluble material by the activated carbon, mixing a diatomaceous earth with the whisky-carbon mixture to form a slurry, depositing the slurry on a filter to form a filter bed, and then filtering the whisky from the slurry.

4. The process of chill-proofing whisky having insoluble material therein, which consists in mixing fine activated carbon with the whisky to provide for the adsorption of the insoluble material by the activated carbon, mixing a diatomaceous earth with the whisky-carbon mixture in the proportion of approximately 10 grams of diatomaceous earth per gallon of whisky to be filtered to form a slurry, depositing the slurry on a filter to form a filter bed, and then filtering the whisky from the slurry.

HARRY G. ATWOOD.